United States Patent [19]
McClain

[11] 4,151,135
[45] Apr. 24, 1979

[54] PROCESSES FOR PRODUCING DRY POWDERS FROM TACKY POLYMERS VIA DISPERSION OF SAME IN WATER WITH DISPERSANTS CONVERTIBLE TO PARTING AGENTS

[75] Inventor: Dorothee M. McClain, Cincinnati, Ohio

[73] Assignee: National Distillers and Chemical Corporation, New York, N.Y.

[21] Appl. No.: 824,935

[22] Filed: Aug. 15, 1977

[51] Int. Cl.$^2$ .................... C08F 6/14; C08F 18/08; C08J 3/18; C08J 3/20
[52] U.S. Cl. ................. 260/23 R; 260/23 H
[58] Field of Search ............. 260/23 R, 23 H

[56] References Cited

U.S. PATENT DOCUMENTS

| | | | |
|---|---|---|---|
| 3,090,763 | 5/1963 | Hillier | 260/23 X |
| 3,347,811 | 10/1967 | Bissot | 260/29.6 H |
| 3,422,049 | 1/1969 | McClain | 260/29.2 N |
| 3,432,483 | 3/1969 | Peoples et al. | 260/29.2 R |
| 3,468,827 | 9/1969 | Hill et al. | 260/23 R |
| 3,474,058 | 10/1969 | Ridgeway et al. | 260/28.5 AV |
| 3,503,917 | 3/1970 | Burke | 260/29.6 R |
| 3,517,083 | 6/1970 | Salyer | 260/878 R |
| 3,891,587 | 6/1975 | Watts | 260/23 H |
| 3,968,091 | 7/1976 | Stiles et al. | 528/503 |

*Primary Examiner*—Ronald W. Griffin
*Attorney, Agent, or Firm*—Kenneth D. Tremain

[57] ABSTRACT

Processes are disclosed for comminuting and recovering as dry powders tacky ethylene-vinyl acetate (EVA) copolymers and tacky partially-hydrolyzed ethylene-vinyl acetate (HEVA) copolymers. The copolymers are comminuted by dispersion in water with an alkali metal soap of a higher carboxylic acid. Chemical conversion of the soap after dispersion to the alkaline earth metal soap or to the higher carboxylic acid permits recovery of the tacky copolymers as dry powders. The compaction resistance of the higher carboxylic acid-coated particles is improved by chemically converting deposited acid to the alkaline earth metal soap or by adding supplemental preformed alkaline earth metal soap.

31 Claims, No Drawings

PROCESSES FOR PRODUCING DRY POWDERS FROM TACKY POLYMERS VIA DISPERSION OF SAME IN WATER WITH DISPERSANTS CONVERTIBLE TO PARTING AGENTS

BACKGROUND OF THE INVENTION
1. Field of the Invention

This invention relates to the field of tacky ethylene-vinyl acetate copolymers and to the tacky partially-hydrolyzed ethylene-vinyl acetate copolymers, and more particularly, to processes for comminuting these copolymers and converting them into dry powder compositions.

2. Description of the Prior Art

High pressure ethylene-vinyl acetate (EVA) copolymers are a well-known class of thermoplastic resins. Copolymers containing up to about 60 weight percent of vinyl acetate are now available commercially via a modified high pressure polyethylene process operating at 1000–2000 atmospheres, and compositions containing as much as 85 weight percent vinyl acetate have been made experimentally by the high pressure process. EVA resins containing up to about 35 weight percent of vinyl acetate are readily handled in the form of pellets, yet even resins with a vinyl acetate content in the upper part of this range tend to stick together under the pressure of their own weight, especially under hot storage conditions. Copolymers containing between about 35 and about 60 weight percent of vinyl acetate can also be pelletized, but the pellets tend to be tacky and coalesce increasingly at higher vinyl acetate contents in this range. At about 40 to 45 weight percent vinyl acetate, the pellets maintain their identity, but often partially fuse into bulky masses resembling bunches of grapes. At 50 to 60 weight percent vinyl acetate content, the pellets soon lose their identity and these resins normally assume the shape of their container by cold flow, and consequently are only available as solid blocks. Copolymers containing 35–85 weight percent vinyl acetate can be produced with melt flow rates below 5 (Condition B, ASTM D1238) and in most cases as low as 0.2, when finished by thermal treatment by known methods, e.g. U.S. Pat. No. 3,968,091.

U.S. Pat. No. 3,517,083 discloses that EVA resins containing 15 to 60 weight percent vinyl acetate may be used as impact modifiers in rigid polyvinyl chloride (PVC) formulations, and that EVA copolymers containing 60 to 85 weight percent vinyl acetate are useful in producing flexible blends with PVC. However, a serious impediment in blending high pressure EVA into PVC is the aforesaid physical form of the EVA resins. To blend even EVA pellets into PVC, which is normally supplied as a powder, requires the expenditure of considerable energy and introduces an undesirable heat history into the PVC (e.g., see Plastics Engineering, April 1967, p. 47; Plastics Technology, July 1975, P. 50). Blending of the fused pellets characteristic of the EVA resins containing above about 50 weight percent vinyl acetate would obviously be still more difficult than blending free pellets.

Accordingly, to facilitate the blending of high pressure EVA copolymers into PVC powder, and into other pulverulent polymers as well, it would be highly desirable to have the EVA copolymers in the powder form. Dry blending of PVC powder and the EVA powder could then be readily accomplished at little expenditure of energy and without imparting an undesirable heat history to the heat-sensitive PVC due to the blending operation itself. Prior to the present invention, however, tacky EVA copolymers containing from 35 up to about 85 weight percent vinyl acetate, in particular those made by the high pressure process, have not been available as dry powders, although copolymers containing 60 to 70 weight percent vinyl acetate and made by emulsion polymerization can be recovered as powders suitable for dry blending. However, emulsion EVA resins of lower vinyl acetate content are not available and, since emulsion polymerization is comparatively a slower process than the high pressure process, it would be advantageous to synthesize the EVA resins by the rapid high pressure process and convert this broad range of EVA resins to powders by an equally rapid process.

Hydrolyzed ethylene-vinyl acetate (HEVA) copolymers, particularly the so-called partially hydrolyzed copolymers, herein defined as EVA resins originally contain about 35 to about 85 weight percent of vinyl acetate have been generally known for may years. They resemble the high pressure EVA resins in being inherently tacky materials but present certain advantages by virtue of their hydroxyl functionality, e.g. enhanced adhesion to various substrates, additional cross-linkability, and have superior heat and mill stability as compared to EVA. In addition, as disclosed in this invention, those less than 50% hydrolyzed also function as impact modifiers in rigid PVC formulations, whereas the substantially fully hydrolyzed EVA resins do not.

According to U.S. Pat. No. 3,474,058, films cast from EVA copolymer can be given improved slip and anti-blocking properties by incorporating therein small amounts of a metal salt of a fatty acid having from about 12 to 22 carbon atoms, for example, calcium stearate, in combination with a fatty acid amide, for example, stearyl amide. Commonly assigned, copending U.S. patent application Ser. No. 783,527, filed Apr. 1, 1977 discloses and claims a vinyl acetate ethylene elastomeric copolymer having improved anti-block characteristics imparted thereto by the presence of a small amount of a hydrogenated glyceride or mixture of glycerides such as refined hydrogenated tallow glyceride. In addition to improved anti-block characteristics, the copolymer can also be provided with improved processing release properties by combining the glyceride or mixture of glycerides with stearic acid. U.S. Pat. No. 3,468,827 describes a method for reducing the corrosive nature of EVA copolymers for steel and other materials with which these resins come into contact during processing, carried out by incorporating into the resins a salt of fatty acid such as calcium stearate.

SUMMARY OF THE INVENTION

Processes have now been discovered that permit the comminution of tacky EVA copolymers and tacky HEVA copolymers from the pellet and block form into the form of fine particles via dispersion in an aqueous medium with the aid of an alkali metal soap of a higher carboxylic acid as the dispersing agent, optionally in the presence of a water-soluble, substantially neutral salt, and the subsequent recovery of the particles from the dispersion as compaction-resistant dry powders by chemically modifying the dispersing agent in situ to provide a protective coating for the particles. In the preferred embodiment, the alkali metal soap dispersing agent is converted to the corresponding alkaline earth metal soap by reacting it with a suitable alkaline earth metal compound, e.g., calcium hydroxide. Alternatively, the alkali metal soap dispersing agent can be modified chemically by acidifying it with sufficient acid to release the corresponding carboxylic acid at least in part, which provides sufficient protective action to permit the dispersed copolymers to be isolated, dried, and handled as free-flowing powders. Higher carboxylic acid-protected powders, however, are inferior in compaction resistance to alkaline earth metal soap protected powders, but the acid coating is readily converted to alkaline earth metal soap coatings by reaction with sufficient alkaline earth metal compound. As an alternative, the acid-coated particles can be coated with alkaline earth metal soap, either preformed or formed in situ.

By including sufficient saponifying agent in the EVA dispersion step to saponify the combined vinyl acetate in the EVA, the corresponding HEVA may be obtained directly as the dry powder, after applying any of the above methods for providing protection, without the need for hydrolysis before dispersion.

This invention also provides novel blends of polymer powders prepared by dry-blending two or more individual polymer powders, at least one of which is an above-described EVA or HEVA powder composition.

Among the most preferred powder blends are those comprising about 1 to about 99 weight percent of an EVA containing from about 15 to about 85 weight percent of vinyl acetate of an HEVA derived therefrom in which no more than half of the combined vinyl acetate has been hydrolyzed, and, correspondingly from about 99 to about 1 weight percent of a vinyl chloride polymer containing 85-100 weight percent of vinyl chloride and 0-15 weight percent of at least one copolymerizable monomer. To such blends may also be added conventional additives such as stabilizers, fillers, colorants, processing aids, coplasticizers, lubricants as needed in excess of higher carboxylic acids and/or alkaline earth metal salts present in the EVA and/or HEVA powders, and free-radical inhibitors.

Another preferred powder blend comprises an EVA copolymer powder composition in which the EVA copolymer contains between about 45 and 65 weight percent vinyl acetate, and a pulverulent filler such as a reinforcing carbon or a mineral filler such as silica, in proportions ranging from about 25-75 weight percent EVA and correspondingly from about 75-25 weight percent of filler. Included also are similar powder blends in which a HEVA powder of this invention partially or totally replaces the EVA powder. Other elastomer and polymer powders may replace part of the EVA and HEVA powder. The aforesaid polymer powder-filler blends will also contain suitable vulcanizing agents, e.g., organic peroxides; stabilizers, vulcanization accelerators, plasticizers, extenders, lubricants, etc. in appropriate amounts to provide powdered rubber compositions that can be vulcanized or cured to provide heat-resistant and solvent-resistant rubbers.

The copolymers of this invention cannot effectively be reduced to dry powders of the desired particle size by conventional mechanical comminution methods, as for example by employing ball mills, hammer mills, attrition mills, etc.; their inherent tacky, elastic nature renders them resistant to fracture into particles, and the heat buildup due to grinding further softens the copolymers and makes them even more tacky. Application of cooling as in cryogenic grinding with liquid nitrogen alleviates the situation to a considerable extent, but, as compared to the powders of this invention, it is found that only relatively coarse particles can be produced at economical coolant consumption levels. In addition, the cryogenically-ground particles require the addition of a parting agent before they can be allowed to warm to room temperature. This operation is relatively cumbersome because it is difficult to achieve proper contact between the cold particles and the parting agent, without partial agglomeration during warm-up and dusting by unattached parting agent particles.

Powders might in principle be recovered from artificial latexes of the copolymers, produced either by an organic solvent procedure such as those described in U.S. Pat. Nos. 3,347,811 and 3,503,917, or preferably by a simplified "water process" such as those described in U.S. Pat. Nos. 3,422,049 and 3,432,483. However, for the copolymers of the present invention, recovery by simple filtration or centrifugation is accompanied by extensive coalescence of the particles. Even when particulate products can be isolated, they are difficult to dry effectively without fusion.

It is, of course, possible to add the parting agents directly to dispersions produced by methods of the art, advantageously to dispersions produced by the water process with Pluronic dispersing agents in accordance with the above-cited patents. However, such a procedure suffers from several disadvantages. The mixtures produced by adding an alkaline earth metal soap of a higher carboxylic acid as a parting agent directly to dispersions of a copolymer of this invention produced with a Pluronic dispersant are, as a practical matter, very difficult and troublesome to filter. The filter media are apparently blocked by very fine particles of parting agent that do not adhere well to the dispersed polymer particles. It is not certain why the parting agent should fail to adhere to copolymer particles made with Pluronic dispersants; however, the Pluronics have good water-solubility at room temperature and may exert a cleaning action at the particle surface, to remove any substance that might otherwise become attached thereto, such as an alkaline earth metal soap of a higher carboxylic acid. Further, Pluronic dispersants are costly and must be recovered and recycled for economic reasons. If an amount of an alkaline earth metal soap of a higher carboxylic acid sufficient for adequate parting is deposited on copolymer particles dispersed with Pluronic dispersant, it is evident that any portion of the Pluronic dispersant that is contained within the particles, or attached immediately to the surface thereof, will be trapped by the subsequently deposited over-coating of alkaline earth metal soap. Accordingly, removal of this amount of trapped Pluronic surfactant by normal washing procedures after deposition of the parting agent will be exceedingly difficult. Residual amounts of such Pluronic dispersants may be objectionable in the end-use to which the dry powder is put, and, if not, will at least represent a loss of an expensive material. In any event, it must be recognized that washing of the wet cake to recover whatever amount of Pluronic that can be removed adds an additional time-consuming step to the process.

Additionally, the dispersing action of recycled Pluronic dispersants is adversely affected if they become contaminated by small amounts of alkaline earth metal soaps, as can be expected to happen in any operation in which the two substances come into intimate contact.

In effect, the present invention provides a process which utilizes the dispersing agent from the dispersion process as the source of the parting agent by simple chemical conversion, overcoming many of the difficulties associated with the prior art processes, e.g., those predicated on the use of the "water process" followed by treatment with parting agent.

DESCRIPTION OF THE PREFERRED EMBODIMENTS

A. Preparation of Particulate EVA Copolymers

Although the EVA and HEVA copolymers employed in the practice of this invention can be prepared by any suitable polymerization process, for example by way of solution and dispersion or emulsion polymerization techniques, they are advantageously prepared by the much faster high pressure bulk polymerization process in current use.

The EVA copolymers herein contain from about 15 to about 75 percent by weight of combined ethylene, the balance of the polymer being made up of combined vinyl acetate. The copolymers can also contain up to about 20% by weight of a combined third comonomer polymerizable with ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, and the like. When a third conomoner is present in the polymer, the vinyl acetate content of the balance of the polymer will vary from 25 to 85% of the said balance, the remainder being ethylene.

The melt flow rates of the EVA copolymers can range from less than about 0.1 to up to about 100 or even higher. (Condition B, ASTM D1238-73). The preferred copolymers are those with a MFR of less than about 40, more preferred are those of less than about 25, and most preferred are the copolymers of less than about 10 MFR.

According to the present process, EVA copolymer is agitated in the molten state in an aqueous dispersion system comprising an alkali metal soap of a higher carboxylic acid optionally with a water-soluble, substantially neutral salt inert to the soap, and the dispersion system with the copolymer in the disperse state is cooled to below about 100° C. Thereafter, the dispersion may be converted to a dry powder by any of several alternative procedures such as conversion of the soap after dispersion into a less soluble form, as by acidification to release the corresponding higher carboxylic acid, or reaction with a source of alkaline earth metal, e.g. salt to produce an insoluble soap (Ca, Ba, Sr, Mg soap, etc.), thereby providing a parting agent for the dispersed tacky polymer particles and separating the thus treated disperse particles as by filtration.

The filter cake is washed with cold water, preferably deionized or distilled, to remove contained water-soluble compounds and the washings are combined with the mother liquor. These washings contain very little if any soap or higher carboxylic acid. The acid employed for acidification is desirably selected to match the anion of the aforesaid water-soluble, substantially neutral salt if present, e.g., hydrochloric acid for sodium chloride. When the source of alkaline earth metal ions, e.g., calcium hydroxide is added to convert the higher carboxylic acid soap to an insoluble soap, e.g., calcium soap, for a parting agent, the mother liquor will contain alkali metal hydroxide which can be recycled, for example to make additional in situ soap or simply neutralized to provide additional water-soluble salt. Normally a substantial proportion of the water is then removed by distillation and the residue, containing substantially all of the water-soluble salt and alkali (if any) can be recycled.

In each of the aforedescribed processes, the soap component of the dispersant system can be a preformed soap or, alternatively, the soap can be produced in situ, with substantially the same results as far as dispersion formation is concerned.

Each of the components may be introduced independently and separately in these processes but it is also possible to combine two or more of the components before introduction into the dispersion vessel. For example, the water-soluble, substantially neutral salt and the preformed soap, when used, are conveniently added in solution in part of the water used to produce the dispersion. Where in situ soaps are employed, the base introduced to neutralize the higher carboxylic acid may also be added in aqueous solution, either in a separate solution or in the same solution as the water-soluble salt. However, it is preferred not to add a preformed soap in the same solution as the water-soluble salt. The EVA copolymer itself may also be employed as a medium for introducing the other components. Thus, for example, where an in situ soap is desired, it is convenient to blend the higher carboxylic acid into the copolymer before introduction into the dispersion, and, where a preformed soap is employed, this, too, can be blended into the polymer prior to dispersion. Less commonly, the water-soluble salt is blended into the copolymer before dispersion, either alone or in combination with preformed soap or with the higher carboxylic acid for making in situ soap. The practice of blending into the copolymer water-soluble, substantially neutral salt, higher carboxylic acid for in situ soap and base to make the in situ soap before dispersion is ordinarily not preferred.

As an alternative in situ soap formation, the soap can be formed from a glyceride or other ester by saponification with slightly more than the stoichiometrically required amount of base. The triglyceride or other higher carboxylic acid ester may be added directly to the dispersion vessel or previously blended into the polymer along with the other dispersion components. These processes can also be carried out as a continuous operation, in the manner described in U.S. Pat. No. 3,432,483. In such continuous operation, the EVA copolymer to be dispersed is fed to the bottom of the dispersion vessel and the dispersion is removed at the top of the dispersion vessel. Separate lines supplying the various components of the dispersion enter the bottom of the vessel itself which can be provided with a pre-mixing zone. The components may be introduced separately or in combination as hereinbefore described.

The preferred soaps are soaps of alkali metals of atomic weight of at least 23 i.e. sodium, potassium, rubidium and cesium, and, of these, the more preferred are sodium and potassium because of their availability or ease of preparation, the most preferred being sodium which is most economical and practical.

The soaps for use in the foregoing dispersion processes are known compounds, i.e. salts of higher carboxylic acids with the alkali metals.

The higher carboxylic acid moiety of the soap is normally a monobasic acid, although certain dibasic acids are effective. The acid moiety may be linear or branched. It may be saturated or unsaturated, usually ethylenically unsaturated. Most commonly, however, the higher carboxylic acid moiety is a fatty acid moiety, and it can be composed of a mixture of such acids, for example as is obtained by saponification of natural glyceride fats. The term "higher carboxylic acid" as used in this invention includes the so-called dimer acids made be dimerization of polyunsaturated linear fatty acids. Also included in the term "higher carboxylic acid" are rosin or abietic acids. The soap should not react adversely to any appreciable extent with the polymer substrates, i.e., it should be substantially inert to the polymer. As employed herein, and in the appended clauses, the term "soap" embraces the aforesaid salts of higher carboxylic acids.

The preferred higher carboxylic acid is a straight-chain $C_8$-$C_{22}$ monocarboxylic acid, which can be saturated or can contain one or more carbon-carbon double bonds per molecule, and can contain an even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linoleinic acid as well as mixtures of such acids, and dimeric acids made by the dimerization of polyunsaturated fatty acids, e.g., linolenic acid. Dimeric acids are commercially available and contain 75–95% dimer, 4–25% trimer, and from a trace to 3% of monomeric polyunsaturated fatty acid. Rosin or abietic-type acids useful in this dehydrogenated rosin, and polymerized rosin, all of which are available commercially, e.g., from Hercules, Inc. under the trade name of Resin 731D and Polypale, respectively.

Where a preformed soap is introduced, it will be a soap prepared by neutralization of one of the above disclosed acids or mixtures, with one or mixtures of the bases disclosed below or alternatively, commercially available fatty acid salts can be used.

When an in situ soap is employed, the soap is formed by reacting the higher carboxylic acid with an alkali metal hydroxide. Alternatively, the corresponding bicarbonate or carbonate can be used. Examples of the alkali metal hydroxides that can be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate may be substituted for the corresponding hydroxides. Mixtures of the said alkali metal compounds can be employed.

The optional water-soluble salt is a substantially neutral salt. For the purposes of this invention, such a salt is defined as one that, at a concentration of 1.0 molar in pure water at 20° C., produces a solution whose pH lies between 4 and 9. The cation of the salt is derived from an alkali metal or any other metal that does not form insoluble soaps with the above-disclosed higher carboxylic acids at the operating temperature of the process i.e., is inert to the soap employed. The cation may be monovalent, divalent or of higher valence. The nature of the anion of the salt does not appear to be critical; the anion can be for example, fluoride, chloride, bromide, iodide, bisulfate, sulfate, hydrogen phosphate, dihydrogen phosphate, nitrate, bicarbonate, acetate or propionate anion, or similar such anions. Mixtures of salts can be employed.

Specific examples of the water-soluble salts are lithium fluoride, lithium chloride, sodium chloride, sodium bisulfate, sodium sulfate, sodium hydrogen phosphate, ammonium chloride, potassium dihydrogen phosphate, sodium acetate, sodium propionate, etc. The cation of the soap and the water-soluble salt may be the same or different.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.2 to about 0.5 parts of polymer per part of water on a weight basis. For in situ soap formation, equivalent amounts of base are added to the fatty acid, the preferred ratio being from about 1.05 to about 1.1. Higher ratios are of no advantage unless saponification of the polymer is desired. The weight ratio of fatty acid soap to polymer may vary from about 0.01 to about 0.30, the preferred ratio being from about 0.03 to about 0.12. The use of lower ratios of soap does not always result in the desired dispersion of the copolymer; high ratios are generally unnecessary and therefore uneconomical. The preferred higher carboxylic acid soap is a fatty acid soap, the most preferred fatty acid soap being sodium stearate.

Although the EVA and HEVA copolymers of this invention can be dispersed in the absence of a water-soluble, substantially neutral salt, the latter is often included to regulate particle size. The added salt will produce smaller primary particles at appropriate concentration ranges. Nevertheless, the particles actually recovered when water-soluble, substantially neutral salts are present during dispersion tend to be agglomerates of the primary particles, so that the net effect of added salt is often to produce an agglomerate that is coarser than the primary particles formed in the absence of the salt. The concentration of water-soluble, substantially neutral salt in the water may range from at least about 0.1 and up to about 15 weight percent. Sodium chloride, sodium sulfate, and sodium acetate are the preferred water-soluble salts. Halide salts, particularly chlorides, though operable, are not preferred with stainless steel equipment, because of the tendency to cause stress-corrosion cracking of the steel. A nickel alloy (Monel) is preferred for halide service.

The dispersion temperature may range from about 100° to about 270° C., but temperatures of from about 130° to about 250° C. are preferred. Dispersions are usually not readily obtainable at lower tempertures and higher temperatures are usually not required for successful dispersion. The pressure is autogenous. The rate of stirring should vary from about 2600 to about 4000 rpm with from about 3200 to about 3800 rpm being preferred, although stirring rates that are lower are at times sufficient. Higher stirring rates may be employed but usually are not advantageous. The dispersion times range from about 1 minutes to about 1 hour; times of about 5 to about 15 minutes are preferred.

The dispersions of EVA or HEVA copolymer substrate preferred for use in the present invention are generally composed of particles, usually spherical, of an average diameter ranging from about 20 microns up to about 500 microns, with the majority (80–90%) of particles being less than 250 microns. With the preferred dispersing systems, a substantial majority of the particles are less than about 150 microns, usually ranging from about 20 to about 150 microns with most of the particles being in the range of about 50 to about 100 microns. As should be expected, the efficiency of these dispersion processes and the particle size of the dispersed products will vary to a certain extent with the selected soap and salt, the temperature, the amounts of reagents employed and other factors with which those skilled in the art are familiar.

The HEVA copolymers which are useful in the practice of this invention may be prepared by any one of several known and conventional hydrolysis processes, for example, by alcoholysis of EVA in a solution of a hydrocarbon and an alcohol (U.S. Pat. No. 3,985,719). Partially hydrolyzed EVA copolymers are normally elastomeric and more or less tacky at room temperature.

For reasons of efficiency and convenience, however, it is preferred to conduct the hydrolysis by saponification during the comminution-dispersion process itself, by adding a sufficient amount of a strong inorganic base to saponify the desired amount of combined vinyl acetate. The saponification-dispersion process is described in detail in copending U.S. patent application Ser. No. 824,934, filed Aug. 15, 1977 incorporated herein by reference. The same strong bases recited above in connection with the preparation of alkali metal fatty acid soaps can be used as saponification agents, with sodium hydroxide and potassium hydroxide being preferred.

The choice of coating techniques will to some extent be determined by the procedure used for preparing the particulate EVA and HEVA copolymer particles. When an EVA copolymer dispersion is prepared according to the preferred processes described above, the dispersion will contain an alkali metal salt of a higher carboxylic acid.

In the preferred embodiment of this invention, an alkaline earth metal compound such as magnesium hydroxide, calcium hydroxide, strontium hydroxide, barium hydroxide, or a corresponding oxide, bicarbonate, carbonate, halide, and the like is added to the cooled dispersion of EVA and HEVA copolymer to convert the alkali metal soap, employed as dispersing agent, into an insoluble alkaline earth metal soap. The insoluble alkaline earth metal soap will then coat the copolymer particles, the amount deposited being regulated by the amount of alkali metal soap employed to disperse the copolymer, with an alkaline earth metal compound being added in stoichiometric amount or in slight excess. Calcium hydroxide is the preferred alkaline earth metal compound and may be added as an aqueous solution, as an aqueous dispersion, or in the solid form, conveniently as a powder. The metathetical reaction is very rapid and complete. When the alkaline earth metal salt is a hydroxide, an oxide or a carbonate, an alkali hydroxide or carbonate is produced as a by-product that can be recovered and reacted with more higher carboxylic acid to produce additional alkali metal soap for subsequent dispersions. The individual EVA and HEVA copolymer particles will be coated over substantially the entire outermost surfaces thereof with insoluble alkaline earth soap thereby providing the copolymer particles with greatly improved parting characteristics. Such powders, which are easy to recover by filtration will withstand drying at elevated temperatures, and will have sufficient compaction resistance when bags of powder are stacked under hot storage conditions.

The amount of alkaline earth metal soap required will be dictated by the amount necessary to impart the desired compaction resistance to the final dry powder. The amount of alkali metal soap used in the dispersion process can be adjusted to provide for the desired amount of alkaline earth metal soap parting agent. If desired, supplemental preformed alkaline earth metal soap of a higher carboxylic acid may be added to provide additional compaction resistance.

Parting agent fines do not present a problem, as they do when an alkaline earth metal soap is subsequently added as a parting agent to copolymer particles dispersed with Pluronic dispersants. Perhaps a portion of alkali metal soap used as a dispersant is anchored firmly to the particle surfaces, perhaps by solubility of the long hydrocarbon part of the soap molecules in the particle, leaving the ionic end of the molecule at the water-particle interface. When reaction with calcium hydroxide occurs, the calcium ion by virtue of its divalent nature, can serve as a bridging moiety between an aforesaid higher carboxylic acid soap anion anchored in the outermost particle layer and another higher carboxylic acid soap anion dissolved or dispersed in the aqueous medium. Additionally, it is possible that the ionic character of the alkaline earth soap parting agent thus anchored to the particle surface can, by coulombic forces, serve to attract and bind additional molecules of alkaline earth soap molecules to the particle. However, applicant does not wish to be bound by this theoretical explanation of this invention.

It is obvious, of course, that there is no need to separate and recycle any of the alkali metal soap used as dispersing agent, nor is it advantageous to do so. Substantially all of it is converted to alkaline earth metal soap parting agent.

When the powder is employed as a dry-blendable impact modifier in rigid PVC, the alkaline earth metal soap finally serves as an external lubricant in the formulation. The great versatility of this embodiment of the invention is apparent from the fact that the same given amount of higher carboxylic acid serves three main functions: (a) as the alkali metal soap it comminutes tacky EVA copolymers from the pellet or block form into the fine particle form by dispersion in water; (b) on conversion to the alkaline earth soap, it provides parting action to permit isolation and handling of the dispersed particles as a compaction-resistant dry powder; and (3) also in the alkaline earth soap form it can perform various functions in subsequent formulations, e.g., as a lubricant in rigid PVC formulations.

The preferred EVA copolymer dispersion system for use in this coating operation contains sodium or potassium stearate (and optionally the corresponding chloride) and the preferred alkaline earth metal compound is calcium hydroxide.

Thus, the preferred parting agent according to this invention is calcium stearate.

In a further embodiment of the invention, an acid, for example, acetic acid, hydrochloric acid or sulfuric acid is added to the cooled dispersion of the EVA copolymer to convert the alkali metal higher carboxylic acid soap therein to the corresponding water-insoluble higher carboxylic acid. The higher carboxylic acid will in this manner coat the copolymer particles. The protective action of the higher carboxylic acid is normally sufficient to permit recovery of the powder without any danger of coalescing the particles. Filtration is rapid, and the powder can be dried under mild conditions but will not, in general, have sufficient compaction resistance for storage at elevated temperatures. It is advantageous to add a supplemental amount of preformed or in situ alkaline earth metal soap to achieve greater compaction resistance. The addition may be made directly to the acidified dispersion, or it may be blended into the wet filter cake, or added to the dry, higher carboxylic acid-coated particles. The parting agent may advantageously be added as a paste with, for example, a small amount of an alcohol, such as methanol, ethanol, propanol, etc.

In another embodiment, EVA particles coated as described above with a higher carboxylic acid released by acidification of the dispersion are thereafter treated as described above for the preferred embodiment of this invention with an alkaline earth metal compound such as magnesium hydroxide, calcium hydroxide, strontium hydroxide, barium hydroxide or the corresponding oxides, bicarbonates, carbonates and the like, to convert the higher carboxylic acid coating on the particles to the corresponding alkaline earth metal soap. Calcium hydroxide is the preferred alkaline earth metal compound.

Acceptable results can be obtained by coating the EVA and HEVA particles with from about 1% to about 30% by weight of alkaline earth metal fatty acid soap, and preferably from about 3% to about 18% of this parting agent.

The relative molecular weights of the polymers of this invention are compared by means of their melt flow rates and/or their Mooney viscosities. Melt flow rate, abbreviated MFR, was determined according to ASTM D-1238-73, Condition B. In some cases Condition E of this procedure was used; such melt flow rates are called "melt indexes" herein. Mooney viscosities were determined according to ASTM D1646-74. The polymers of this invention were also characterized by means of their vinyl acetate content. The vinyl acetate content was determined by a special saponification procedure involving the use of toluene as a solvent and ethanolic KOH solution as the saponifying agent. The results are reported as weight-percent vinyl acetate, abbreviated "wt. % VA".

In all of the dispersion experiments, deionized or distilled water was employed, and is preferred, but tap water may also be used. In some of these experiments an inhibitor was included to suppress molecular weight increase during dispersion. Santowhite crystals [4,4'-thiobis (6-tert-butyl-m-cresol] obtained from Monsanto Co. served this purpose, but other inhibitors may be used, as disclosed in copending U.S. patent application Ser. No.824,936, filed Aug. 15, 1977.

The relative amounts of the ingredients in mixtures and composition described herein after are often reported in terms of "parts per hundred parts of resin" on a weight basis, abbreviated "phr" or "pph."

The agglomeration or compaction resistance of the dry powder compositions produced by the processes of this invention was tested by placing a 10 g sample of the powder in a 50 ml beaker and inserting a closely fitting polystyrene bottle (1⅜ in. O.D.) containing lead shot so that the 10 g powder sample would be subjected to compression. The assembly was placed in an air oven at 120° F. (49° C.) for 24 hours, removed, and allowed to cool. The samples were deemed to have passed the compaction test if they could readily be broken up into a powder again, e.g. by stirring with a spatula. Sieving the powder before and after the compaction test provided a better idea of compaction resistance, i.e. little change in distribution indicating little compaction. Tests were run with 687.2 g. of shot in each bottle, an amount sufficient to exert a compression of 1 psi in the sample. In some tests, one-third of this weight was used.

The dry powder compositions were tested as impact modifiers by dry blending them into PVC powder, together with suitable PVC stabilizers. PVC powders employed were Geon 103EP and Geon 121, supplied by the B. F. Goodrich Co., or BK-75 from Goodyear Tire & Rubber Co. The PVC stabilizers included Mark C, a phosphite chelator, and Mark 235, a solid Ba/Cd stabilizer, both provided by Argus Chemical Corporation; and Thermolite 31, a sulfur-containing organotin stabilizer obtained from M & T Chemicals, Inc. The blends were milled in a two-roll Thropp mill at the temperatures and times indicated. The milled composition was then compression molded into sheets from which specimens for Izod impact and other physical tests were obtained. The test procedures were as follows:

Tensile strength and elongation—ASTM D638-67T
Flexural strength and Flexural modular—ASTM D790-66
Izod notched impact—ASTM D256-56
heat distortion—ASTM D648-56
Shore D hardness—ASTM D2240-64T The EVA copolymers used in the examples were obtained from U.S. Industrial Chemicals Co., Division of National Distillers and Chemicals Corp. One type of EVA copolymer used nominally contains about 38.5 to 42.4 weight percent combined vinyl acetate and has an MFR of 0.5 to 1.5. At one time this copolymer was known by the trade name ULTRATHENE UE 644; the trade name is not VYNATHENE EY 901. This copolymer is available as nominal ⅛-inch pellets, which are often more or less fused together at higher vinyl acetate contents in the specification range. Another type of copolymer employed was VYNATHENE EY 907, available from the same source as massive, solid blocks. EY 907 nominally contains 60 to 64 weight percent vinyl acetate and has an MFR of about 0.2 to 1. The lots of each copolymer used in the examples were mainly experimental resins that deviated somewhat from the above specifications; accordingly, the individual lots were generally analyzed for vinyl acetate content and MFR.

Although the following examples are particularly referenced to the coating of EVA copolymer particles, similar results can be obtained with HEVA copolymer particles employing the same procedures.

EXAMPLE 1

This example describes the comminution of tacky pellets of an ethylene-vinyl acetate copolymer containing about 40 weight percent of vinyl acetate by dispersion in water in the presence of sodium stearate and sodium chloride, and various qualitative experiments aimed at recovering the dispersed copolymer as a dry powder. Thus, 120 g of ULTRATHENE UE 644, 600 ml of water, 12 g of sodium stearate and 13.9 g of sodium chloride were charged to a 1-liter Monel metal Parr autoclave equipped with a heating jacket, thermocouple, pressure gage, and stirrer connected to a drill press driven by a 1 H.P.D.C. motor. The stirrer was of the turbine type described previously in U.S. Patent Application Ser. No. 824,874, filed Aug. 15, 1977. The contents of the autoclave were heated to 200° C. and stirred seven minutes to 3100 rpm. The autoclave was cooled rapidly with dry ice to below about 100° C. The dispersion was fluid. It was treated as follows in separate experiments.

a. Filtration of Dispersion

When the dispersion was filtered, the filter paper clogged up and a polymer skin formed, indicating fusion of the dispersed particles.

b. Residue from Drying the Dispersion

Part of the dispersion was allowed to dry in air. A hard deposit remained, which could not be ground into a powder in a Waring Blendor. This result shows that the dispersed particles irreversibly fuse upon drying.

c. Washed Cake from Filtration of Dispersion

A portion of the dispersion was filtered, as in (a) above, and the material collected was washed with water and dried at 30° C. The dry material was soft but it could not be broken up into particles even when milled in a Waring Blendor, again indicating fusion of the dispersed particles.

d. Product from Acidification of Dispersion

Part of the dispersion was acidified with dilute hydrochloric acid solution in a Waring Blendor, filtered, washed, and allowed to dry at 30° C. The dry filter cake was soft and showed no evidence of fusion.

e. Product from Acidification of Dispersion with Acetic Acid

Part of the dispersion was acidified with dilute acetic acid in a Waring Blendor, filtered, and the cake was dried at 30° C. The dry cake was similar to that of (d). The cake was softer.

EXAMPLE 2

In the equipment and in the manner described in Example 1. the ULTRATHENE UE 644 copolymer pellets of Example 1 were again comminuted by dispersion with sodium stearate in the presence of sodium chloride, but the copolymer solids level was higher and, relative to the copolymer, the amounts of sodium stearate and sodium chloride were halved. Thus, 150 g of ULTRATHENE UE 644 pellets, 450 ml of water, 7.5 g of sodium stearate, and 8.7 g of sodium chloride were heated to 200° C., stirred 7 minutes at 3200 rpm and cooled to below about 100° C. The dispersion produced was removed from the autoclave and used to test the efficacy of various substances added as supplemental parting agents. A 50 g portion of the dispersion was employed for each test. The details of the experiments appear in Table 1. In Tests 1–8 in the first part of Table 1, the candidate parting agents were added directly to dispersion samples without acidification of sodium stearate to stearic acid. The products were thus coated with sodium stearate and candidate parting agent. In Tests 9–17 acetic acid was first added to the dispersion samples to convert the sodium stearate dispersing agent to stearic acid. The stearic acid-coated particles were then washed by decantation with two 100-ml portions of water in a Waring Blendor and collected on a filter. The candidate parting agents were thereafter added to the wet filter cake. These products were coated with stearic acid and supplemental parting agent.

Inspection of Table 1 shows that supplemental parting agents Tamol SN, silicone oil, and Talc yielded fluffy particulate products undesirable for dry blending into pulverulent polymers. Amberlac 165, Cab-O-Sil, calcium silicate, and calcium stearate all yielded ULTRATHENE UE 644 dry powders. However, only calcium stearate gave a powder that passed the compaction test at the level of 4 parts per hundred parts of ULTRATHENE UE 644.

TABLE I

| TESTING OF SECOND PARTING AGENTS FOR ULTRATHENE UE 644 PARTICLES | | | | | |
|---|---|---|---|---|---|
| Test No. | Second Parting Agent | | Point Added | Appearance of Air-Dried Filter Cake | Result of Compaction Test, (0.35 psi, 120° C., 24 Hrs) |
| | Name | Amt., pph | | | |
| 1 | None | 0 | — | Fluffy, does not clump | — |
| 2 | Tamol SN /1/ | 0.8 | Before Acidification | " | — |
| 3 | " | 4 | " | " | — |
| 4 | Silicone Oil /2/ | 2.4 | " | " | — |
| 5 | " | 4 | " | " | — |
| 6 | Amberlac 165 /3/ | 2 | " | Fluffy, sl. clumped | — |
| 7 | " | 4 | " | Coarsely powdery | — |
| 8 | " | 8 | " | More powdery than 7 | Borderline |
| 9 | Cab-O-Sil /4/ | 2 | After Acidification | " | — |
| 10 | " | 4 | " | More powdery than 9 | Failed |
| 11 | Talc | 2 | " | Fluffy, sl. clamped | — |
| 12 | " | 4 | " | " | — |
| 13 | Calcium silicate | 2 | "/5/ | " | — |
| 14 | " | 4 | "/5/ | Powder, not clumped | Failed |
| 15 | Calcium stearate | 2 | " | " | — |
| 16 | " | 4 | " | Powder, finer than 15 | Passed |
| 17 | " | 6 | " | Powder, contains a trace of coarse material | Passed |

/1/ Sodium salt of condensed naphthalene sulfonic acid, Rohm and Haas Co.
/2/ Dimethyl polysiloxane 200 Fluid, Dow Corning Corporation.
/3/ Ammonium salt of a synthetic resin complex, Rohm and Haas Co.
/4/ Fumed silicon dioxide from Cabot Corporation.
/5/ Mixed into the filter cake when it was semi-dry.

EXAMPLE 3

The preferred procedure for recovering dry powder found in Example 2, i.e., successivedly depositing stearic acid and calcium stearate on the particles, was verified on a larger scale in this example. The amount of stearic acid deposited was 4.6 pph and the calcium stearate added after acidification of the dispersion was varied in an effort to find the optimum amount required. The EVA copolymer employed was VYNATHENE EY 901. Thus 150 g of EY 901 pellets, 450 ml of water, 7.5 g of sodium stearate, and 8.75 g of sodium chloride were heated to about 200° C. and stirred for 7 minutes at 3600–3700 rpm. The autoclave was cooled with little stirring—except for occasionally turning the agitator by hand. The autoclave was emptied into a beaker and 600 ml of water was added to the dispersion. The diluted dispersion was stirred mildly until its temperature had reached 24°–25° C. Then 1.54 ml of glacial acetic acid in 150 ml of water was added very slowly, while stirring. A fine precipitate of particles coated with stearic acid resulted. The coated particles were collected by filtration and washed twice with water. A portion of the filter cake was removed without further treatment (Part A). The remainder of the cake was divided into three portions and different amounts of calcium stearate were applied to each (Parts B, C and D). All four samples were dried, analyzed for calcium by atomic absorption and tested for compaction resistance.

| Sample | Acid pph /1/ | Ca, Wt. % | Calcium Stearate pph(Calc.) | Result of Compaction Test (1 psi, 120° F., 24 hours) |
|---|---|---|---|---|
| PART A | 4.6 | — | — | Failed |
| PART B | 4.6 | 0.66 | 11.12 | Passed |
| PART C | 4.6 | 0.46 | 7.50 | Passed |
| PART D | 4.6 | 0.36 | 5.77 | Passed /2/ |

/1/ Amount of stearic acid theoretically available by acidification of the sodium stearate dispersing agent.
/2/ Screen analysis of the powder recovered from the compaction test gave the following results: >840 microns, 1.6%; 420–840 microns, 19.5%; 250–420 microns, 28.9%; 177–250 microns, 23.4%; 105–177 microns, 10.9%; 75–105 microns, 9.4%; and 53–75 microns, 6.2%.

EXAMPLE 4

The procedure of Example 3 was repeated except the addition of calcium stearate was carried out when the washed and filtered EVA copolymer powder coated with stearic acid was in a semi-dry state. This addition was carried out in a Waring Blendor which was run at low speed by means of a rheostat. The results of the compaction test were very similar to those in Example 3.

EXAMPLE 5

The procedure of Example 3 was repeated and the EVA dispersion was acidified to release stearic acid. The particles were recovered and dried to a free-flowing powder. 60 g. of this powder were dry-mixed with 4.2 g. calcium stearate. The mixture passed the compaction test (1 psi, 120° F., 24 hrs). It was then tested as a dry-blendable impact modifier for rigid polyvinyl chloride. The test formulation was the following:
  100 parts by weight of Geon 121 polyvinyl chloride
  1 parts by weight Mark C
  3 parts by weight of Mark 235
  8.55 parts by weight of the EVA powder composition.
The compound was milled on a two-roll mill for 5 minutes at 345° F. Test sheets were prepared by compression molding and the Izod impact value was found to be 20 ft-pounds/inch of notch at room temperature.

EXAMPLE 6

150 g VYNATHENE EY 901 EVA resin pellets was comminuted by dispersion at 235° C. in 450 ml water with the aid of 15 g sodium behenate. A fine dispersion resulted which was discharged from reactor, diluted with 600 ml water and cooled to 24°–25° C. The total cooled slurry was divided into three equal parts.
Part A was filtered and dried.

Part B was acidified with dilute acetic acid as in Example 3 to provide behenic acid coated particles which were thereafter filtered, washed and dried.

Part C was acidified in the same manner as part B and filtered, but the repulping wash consisted of 2 l water containing 0.9 g calcium hydroxide to produce a coating of calcium behenate in situ. The powder remained in the aqueous calcium hydroxide solution for approximately two hours at which time it was filtered, washed and dried.

Part A yielded a very flurry, low density material which failed the compaction test described in Example 3, demonstrating that sodium behenate does not provide sufficient compaction resistance.

Part B was sieved and gave the following distributions:

| % by Weight | Microns |
|---|---|
| 13.01 | <37 |
| 21.14 | 37–53 |
| 43.90 | 53–75 |
| 17.07 | 75–100 |
| 3.25 | 100–149 |
| 1.63 | >149 |

Part B also failed the compaction test, demonstrating that behenic acid along does not provide sufficient compaction resistance, but does not give free-flowing powder.

Part C was sieved and gave the following distribution:

| % by Weight | Microns |
|---|---|
| 11.98 | <37 |
| 21.72 | 37–53 |
| 44.19 | 53–75 |
| 16.10 | 75–100 |
| 3.74 | 100–149 |
| 2.25 | >149 |

Part C passed the compaction test and gave the following distribution after the test, showing that calcium behenate alone provides the desired compaction resistance, with only a minor increase in particle size being observed as a result of the test

| % by Weight | Microns |
|---|---|
| 7.18 | <37 |
| 8.38 | 37–53 |
| 44.31 | 53–75 |
| 32.33 | 75–100 |
| 1.8 | 100–149 |
| 5.99 | >149 |

The calcium analysis of part C was 0.39% by weight.

EXAMPLE 7

150 g VYNATHENE EY 901 pellets was dispersed at 235° C. in 450 ml water containing 13.9 g stearic acid and 1.95 g sodium hydroxide, the latter ingredients reacting to form sodium stearate in situ. After discharge, the dispersion was diluted with 600 ml of water and cooled to 25° C. After cooling, 2 l of water containing 1.9 g calcium hydroxide were added to the powder slurry while stirring. The sodium stearate was converted to calcium stearate by a metathetic reaction. The slurry was filtered, washed and dried. A free-flowing powder resulted which passed the compaction test and gave a calcium analysis of 0.4% by weight.

EXAMPLE 8

In this example a specimen of powder coated with stearic acid only was prepared for testing as a dry-blendable impact modifier in rigid PVC. Thus, 150 g of VYNATHENE EY 901 pellets (42.2 weight percent vinyl acetate, MFR=1.2 g/10 min), 450 ml of water, 15 g of sodium stearate, and 17.5 of sodium chloride were stirred at 2800-3000 rpm for 7 minutes, at 235° C., then cooled to below about 100° C. The dispersion was diluted in a large Warning Blendor and acidified with acetic acid. The particles were collected by filtration, washed twice with water, and dried at room temperature. By calculation this material contained approximately 9.3 pph of stearic acid. Screen analysis showed the following distribution:

420-840 microns—5.5%
250-420microns—8.5%
105-250 microns—73%
Under 105 microns—13%

The powder failed the compaction test (1 psi, 120° F., 24 hours). Specimens were formulated into the following standard PVC test formulation at several levels:

PVC powder (Geon 103 EP): 100 parts by weight
EVA powder composition: variable
Mark C: 1
Mark 235: 3

Izod impact determinations at room temperature gave the following results:

| Dry Powder in PVC Test Formulation, pph /1/ | Izod Impact at Room Temperature, Ft-lbs/in. of Notch | |
| --- | --- | --- |
| | Average | Range |
| 5 | 7.24 | 2.58-14.85 |
| 7.5 | 16.7 | 14.72-19.64 |
| 10 | 12.05 | 10.00-13.00 |

/1/ Milling conditions: 5 minutes at 350° F.

EXAMPLE 9

This example summarizes preliminary pilot plant operations in which the batch process of Example 8 was scaled up in the continuous process described in U.S. Pat. No. 3,432,483. In the continuous unit the resin is fed to the bottom of the autoclave by means of an extruder. Prior to entry into the autoclave, the incoming resin was joined with an aqueous solution of the dispersing agent, here sodium stearate. The latter stream was heated sufficiently to keep the sodium stearate in solution. An additional stream sodium chloride also entered at the bottom of the autoclave. The dispersion was removed at the top of the autoclave and was cooled to below about 100° C. in a heat exchanger before discharge into a collecting tank. From this point on, in the preliminary work of this example, the dispersion was worked up on a batch basis, i.e., measured amounts of the dispersion were acidified with acetic acid to convert the sodium stearate dispersing agent to stearic acid, but no preformed calcium stearate was added. Thus the particles were coated with stearic acid only. The coated particles were collected by filtration, washed with water, and dried.

EXAMPLE 10

In this example a specimen of powder on which coatings of stearic acid and calcium stearate were successively deposited was prepared for testing as an impact improver in rigid PVC. As described in Example 3, 150 g of VYNATHENE EY 901 pellets, 450 ml of water, 7.5 g of sodium stearate, and 8.75 g of sodium chloride were stirred for 7 minutes at 235° C. at 2000-3000 rpm, then cooled below about 100° C. The dispersion was diluted with water in a large Waring Blender and acidified with acetic acid to deposit stearic acid. The particles were collected by filtration and washed twice with water. When the polymer had been dried for about one hour at room temperature, 10.5 g of calcium stearate was mixed into it in the Waring Blender. The compound was allowed to dry in open trays at room temperature. This material passed the compaction test at 0.33 psi, 120° F., 24 hours, as evidenced by the following screen analyses before and after compaction test.

| Microns | Screen Analysis | |
| --- | --- | --- |
| | Before Compaction Test, Wt. % | After Compaction Test, Wt. % |
| 420-840 | 8 | 5.2 |
| 250-420 | 21 | 21.0 |
| 105-250 | 49 | 47.5 |
| Under 105 | 22 | 26.3 |

The powder contained 0.24% Ca by atomic absorption analysis. It was calculated that it contained 5% stearic acid and 7 pph of calcium stearate. A specimen was tested as a dry-blendable impact modifier in rigid PVC (Test Formulation of Example 8), at the 7.5 pph level. The Izod impact values at room temperature were 17.76 ft. lbs/inch of notch, average; 13.92-18.96 ft. lbs/inch of notch, range. The milling time was 5 minutes at 350° F. VYNATHENE EY 901 pellets under the same conditions gave a rigid PVC with an Izod impact of 14.4 ft. lbs/in. of notch. The melt index of the PVC formulation containing pellets was 0.9 g/10 min. whereas it was 7.2 g/10 min. for the PVC containing the dry powder. The higher melt index for the formulation made with the dry powder probably reflects the presence of the stearic acid and calcium stearate, which are recognized as lubricants in rigid PVC.

EXAMPLE 11

In this example, the general technique of Example 3 was again employed to comminute tacky, ⅜-inch pellets of VYNATHENE EY-901 to fine particles by dispersion in water with preformed sodium stearate, both in the presence and absence of added sodium chloride, and to recover the dispersed copolymer particles by depositing successive coatings thereon of stearic acid and calcium stearate, the stearic acid being deposited by acidification of the sodium stearate dispersing agent and the calcium stearate being added preformed after acidification. In addition, recovered dry powder compositions were tested as dry-blendable impact modifiers in rigid PVC. The particular lot of copolymer pellets used in this example contained 42.66 weight percent vinyl acetate and had a MFR of 1.6 g/10 min.

To obtain enough dry powder for testing it was necessary to make several identical runs under each set of the comminution-dispersion conditions selected. Table II summarizes the various sets of conditions employed in this example, it being understood, of course, that the analytical data and impact data also shown in Table II refer to composites of material made under a given set of conditions.

Generally speaking, the dry powder compositions are comparable to pellets in the level of impact resistance imparted, with less specimen-to-specimen variation being observed with the best powders (Exps. 1 and 2, Table II).

The highest impact resistance was observed for the powders with the lower stearic acid level (5 phr). The time of milling of the PVC formulations at 380° F. was critical in this study. Excellent results were obtained after 10 minutes, but inferior results were observed for 5 minutes milling time (see footnote 6, Table II).

ment it was observed that a similar rapid change occurs if the calcium hydroxide is added as a dry powder to the dispersion under conditions of good agitation, as in a Waring blendor. These experiments indicate that the rather large amounts of water, employed here to insure the calcium hydroxide was in solution before addition to the original dispersion, are probably unnecessary and that either dry calcium hydroxide or a slurry thereof in water could be substituted for the solutions of calcium hydroxide.

As in Example 11, less specimen-to-specimen varia-

TABLE II

Preparation and Evaluation of Dry-blendable Vynathene EY-901 Powder Compositions as Impact Modifiers in Rigid PVC. Successive Deposition of Stearic Acid and Preformed Calcium Stearate on Particles Autoclave Charge:
Water - 450 ml.
EY 901 pellets - 150 g.
Sodium stearate - as shown
Sodium chloride - as shown
Dispersion conditions : 235° C., 7 min. rapid stirring Evaluation of EY 901 Dry Powder Compositions

| Exp. No. | Charge to Autoclave | | Calcium stearate added after dispersion, g. | Stearic acid content, wt.% [1] | Ca, wt.% [2,3] | Calcium stearate content, wt.% (calculated from Ca analysis) | Na, wt.% [2,3] | Cl, wt.% [3,4] | Izod Impact of PVC Test Composition containing 7.5 phr of EY 901 dry powder composition, ft.-lbs./in. notch, room temperature[5] | |
|---|---|---|---|---|---|---|---|---|---|---|
| | Sodium stearate, g. | Sodium chloride, g. | | | | | | | Average | Range |
| 1 | 7.5 | 8.75 | 5 | 5.21 | 0.30 | 4.71 | 0.01 | 0.05 | 20.1 | 19.2–20.9 |
| 2 | 7.5 | 8.75 | 7.5 | 5.21 | 0.45 | 7.29 | 0.01 | 0.03 | 21.9 | 21.1–22.8 |
| 3 | 15 | 17.5 | 5 | 8.74 | 0.29 | 4.59 | 0.072 | 0.09 | 13.8 | 11.9–15.4 |
| 4 | 15 | 17.5 | 7.5 | 8.74 | 0.43 | 6.95 | 0.072 | 0.08 | 18.6 | 17.5–21.2 |
| 5 | 15 | — | 5 | 9.63 | 0.31 | 4.93 | 0.044 | — | 17.6 | 16.6–18.1 |
| 6 | 15 | — | 7.5 | 9.63 | 0.44 | 7.13 | 0.044 | — | 16.0[6] | 14.1–17.7[6] |
| 7 | VYNATHENE EY 901 Pellets | | | | | | | | — | 14–22.5 |

[1] After acidification, before adding calcium stearate
[2] Atomic absorption analysis.
[3] Analysis on powder after adding calcium stearate
[4] Wet chemical analysis
[5] Test formulation of Example 8; EY 901 Dry Powder Impact Modifier, 7.5 phr. PVC test formulation milled on two-roll mill for 10 minutes at 380±5° F.
[6] When PVC test formulation was roll-milled only 5 minutes at 380±5° F., the Izod impact values were 3.4-ft-lbs/inch of notch, average;2.6–7.3 ft-lbs/inch of notch, range.

EXAMPLE 12

To determine the effect of the length of the period of contact of the dispersion with calcium hydroxide, three identical experiments were carried out, in each of which 450 ml water, 150 g of EY 901 pellets, and 15 g of sodium stearate were stirred rapidly for 7 minutes at 230° C., cooled to below 100° C. and removed from the autoclave. The three dispersions obtained were cooled to room temperature and combined. The total dispersion was then halved and to each half was added 2.72 g of Ca(OH)$_2$ in 2 liters of water, with stirring. The two portions were recombined and one third of the total was filtered, washed twice with water, and dried (Part A). The second third was treated similarly after standing 1 hour (Part B). Thhe final third of the dispersion was treated in the same way after 24 hours of standing (Part C). The dry powders A, B, and C were analyzed and tested as dry-blendable impact modifiers in rigid PVC. The results obtained are in Table III.

It is evident this preferred technique gives excellent results and that the time of contact of the dispersion with the calcium hydroxide had no discernable effect. Thus, it can be concluded that the reaction of the sodium stearate and calcium hydroxide is practically instantaneous. In accord with this is the fact that the appearance and nature of the original dispersion undergoes a perceptible rapid change as soon as the calcium hydroxide solution is introduced. In a separate experiment it was observed that a similar rapid change occurs tion was observed with the powders than with pellets. The same critical dependence on milling time was also apparent, with poorer results being obtained after 5 minutes of milling than after 18 minutes at 300° F.

The recovered dry powders easily passed the compaction test (1 psi, 120° F., 24 hrs.). In addition, it has been found that these dry powders may be dried at a temperature of 180° F. without fusion.

EXAMPLE 13

This example illustrates the conversion of an ethylene-vinyl acetate copolymer elastomer into a powdered elastomer. The copolymer elastomer used was VYNATHENE EY 907, which is only available in the form of massive, tacky solid blocks. The copolymer contained 60 weight percent of vinyl acetate and had a MFR of 1.2 g/10 min. and a Mooney viscosity of 17. A 150 g portion was cut into pieces small enough to be conveniently charged to the reactor along with 450 ml. of water, and 15.0 g sodium stearate. The elastomer was then comminuted to very fine particles by dispersing it at 191° C. and thereafter cooling to below about 100° C. The yield of dispersed material was above 95%. The dispersion was cooled to 25° C. and acidified with acetic acid. Part of this slurry was filtered, washed and dried at room temperature (Part A). To the other part was added 2 l of water containing 0.9 g calcium hydroxide. This slurry was also filtered, washed and dried at room temperature (Part B). Various amounts of additional calcium stearate were added to portions of part B and the products thereof were analyzed for calcium by atomic absorption. Table IV lists the appearance and performance of these powders and shows that even such a tacky, rubbery material as VYNATHENE EY 907 may be made into free flowing and compaction-resistant powder compositions.

TABLE IV
APPEARANCE AND PERFORMANCE OF DISPERSED EVA COPOLYMER CONTAINING VARYING AMOUNTS OF CALCIUM STEARATE

| | Calcium Stearate Content p.p.h. | Appearance After Drying at Room Temperature | Compaction Resistance at 49° C. and 1 psi load |
|---|---|---|---|
| Part A | — | Crumbs which had fused together | fused |
| Part B (1) | 7.4 | Crumbs which broke up easily into particles | fused |
| Part B (2) | 10.1 | " | Some fusing; but at least better than (1) |
| Part B (3) | 12.9 | " | Material formed plug but could easily be stirred apart into particles |

EXAMPLE 14

The reactor was charged with 150 g of VYNATHENE EY 901 which had an MFR of 0.95 g/10 minutes and a vinyl-acetate content of 37.2%, 450 ml of deionized water 15 g of sodium stearate, and 5 g of sodium hydroxide. The reactor was sealed and heated to 200° C. without stirring. When the contents of the reactor had reached 200° C., stirring was applied at 3700 rpm for seven minutes.

After this period rapid cooling with dry ice was applied together with slow stirring. After the temperature of the reactor contents had dropped to below 100° C., the reactor was opened and the dispersion was diluted with water and cooled. A small aliquot of the dispersion was worked up to remove all the sodium stearate. Analysis show a residual vinyl-acetate content of 34.80% and a sodium ion content of 0.001%. The remainder was slurried with 1.9 g of calcium hydroxide dissolved in 2 L. of water, filtered, washed three times with water and dried. It gave a free-flowing powder with a calcium stearate content of 10.3% and a particle size distribution as follows:

| 9.3% | <106 microns |
| 15.9% | 106–153 microns |
| 33.3% | 250–420 microns |
| 28.5% | >420 microns |

Most of the particles were small agglomerates of very fine primary particles.

What is claimed is:

1. A process for improving the parting characteristics of particulate ethylene-vinyl acetate polymers comprising from about 25% to about 85% vinyl acetate units and corresponding hydrolyzed ethylene-vinyl acetate polymers which comprises agitating in molten state said polymer in an aqueous dispersion system comprising an alkali metal soap and cooling the resulting dispersion to obtain said polymer as finely divided particles; and converting said soap in situ to the carboxylic acid corresponding thereto or to the corresponding alkaline earth metal soap to coat said particles.

2. A process according to claim 1 wherein said dispersion system comprises an alkali metal soap of a saturated fatty acid of from about 8 to about 22 carbon atoms.

3. A process according to claim 1 wherein said dispersion system further comprises a water-soluble substantially neutral salt inert to said soap.

4. A process according to claim 1 wherein said soap comprises an alkali metal stearate.

5. A process according to claim 2 wherein said soap comprises sodium stearate.

6. A process according to claim 1 wherein said converting is effected by addition of a source of alkaline earth metal ions to said dispersion.

7. A process according to claim 6 wherein said source is calcium oxide or calcium hydroxide.

8. A process according to claim 6 wherein the dispersion is acidified prior to said addition.

9. A process according to claim 8 wherein said source is calcium oxide or calcium hydroxide.

10. A process according to claim 1 including the further step of adding to the resulting dispersion a supplemental parting agent for said polymer.

11. A process according to claim 1 wherein said converting is effecting by addition of acid to convert said soap to the corresponding carboxylic acid.

12. A process according to claim 11 wherein said carboxylic acid is stearic acid.

13. A process according to claim 1 including the further step of recovering the resulting polymer which after drying is a free-flowing powder.

14. A process for improving the parting characteristics of particulate saponified ethylene-vinyl acetate polymers which comprises agitating in molten state ethylene-vinyl acetate polymers comprising from about 25% to about 85% vinyl acetate units in an aqueous dispersion system comprising an alkali metal soap together with an alkali metal hydroxide in an amount sufficient to saponify said polymer to a predetermined degree and cooling the resulting dispersion to obtain said polymer as finely divided particles; and converting said soap in situ to the carboxylic acid corresponding thereto or to the corresponding alkaline earth metal soap to coat said particles.

15. A process according to claim 14 wherein said alkali metal hydroxide is sodium hydroxide.

16. A process according to claim 14 wherein said soap comprises sodium stearate.

17. A process according to claim 14 wherein said converting is effected by addition of a source of alkaline earth metal ions to said dispersion.

18. A process according to claim 17 wherein said source is calcium oxide or calcium hydroxide.

19. A process according to claim 17 wherein the dispersion is acidified prior to said addition.

20. A process according to claim 14 wherein said converting is effected by the addition of acid to convert said soap to the corresponding carboxylic acid.

21. A process according to claim 14 including the further step of recovering the resulting powder which after drying is a free-flowing powder.

22. Free-flowing, finely-divided ethylene-vinyl acetate polymers having an average particle diameter ranging from about 20 microns up to about 500 microns with the majority of particles being in the range of about 50 to about 100 microns comprising from about 25% to about 85% vinyl acetate the individual particles of which are surface coated with a higher hydrocarbon carboxylic acid or an alkaline earth metal salt of said acid in accordance with the process of claim 1.

23. A particulate polymer according to claim 22 wherein said acid is stearic acid.

24. A particulate polymer according to claim 22 wherein said alkaline earth metal is a calcium salt.

25. A particulate polymer according to claim 22 wherein said salt is calcium stearate.

26. A particulate polymer according to claim 22 wherein the polymer is an ethylene-vinyl acetate polymer comprising at least about 50% vinyl acetate units, and the acid is stearic acid.

27. A particulate polymer according to claim 26 wherein the salt is calcium stearate.

28. Free-flowing, finely-divided hydrolyzed ethylene-vinyl acetate polymers obtained from ethylene-vinyl acetate polymers containing from about 25% to about 85% vinyl acetate units, said hydrolyzed ethylene-vinyl acetate polymers having an average particle diameter exclusive of surface coating ranging from about 20 microns up to about 500 microns with the majority of particles being in the range of about 50 to about 100 microns and the individual particles of which are surface coated with a higher hydrocarbon carboxylic acid or an alkaline earth metal salt of said acid in accordance with the process of claim 14.

29. A particulate polymer according to claim 28 wherein said acid is stearic acid.

30. A particulate polymer according to claim 29 wherein said alkaline earth metal is a calcium salt.

31. A particulate polymer according to claim 29 wherein said salt is calcium stearate.

* * * * *